United States Patent
Martig et al.

(12) 
(10) Patent No.: US 9,541,177 B2
(45) Date of Patent: Jan. 10, 2017

(54) RATCHETING SHAPE MEMORY ALLOY ACTUATORS AND SYSTEMS AND METHODS INCLUDING THE SAME

(71) Applicant: The Boeing Company, Seal Beach, CA (US)

(72) Inventors: Thomas Martig, Seattle, WA (US); Frederick T. Calkins, Renton, WA (US); Tony Koung, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 371 days.

(21) Appl. No.: 14/051,957

(22) Filed: Oct. 11, 2013

(65) Prior Publication Data

US 2015/0101452 A1    Apr. 16, 2015

(51) Int. Cl.
B64C 13/00 (2006.01)
F16H 25/14 (2006.01)
F03G 7/00 (2006.01)

(52) U.S. Cl.
CPC ............... *F16H 25/14* (2013.01); *F03G 7/00* (2013.01); *Y10T 74/18888* (2015.01)

(58) Field of Classification Search
CPC .. B64C 2027/7288; F16H 25/14; F03G 7/065; Y10T 74/18088
USPC ........................................................ 244/99.8
See application file for complete search history.

(56) References Cited

U.S. PATENT DOCUMENTS

| | | | | |
|---|---|---|---|---|
| 4,700,541 A | * | 10/1987 | Gabriel | B25J 9/1085 148/402 |
| 5,127,228 A | * | 7/1992 | Swenson | F03G 7/065 60/527 |
| 5,150,864 A | * | 9/1992 | Roglin | B64C 3/44 244/17.25 |

(Continued)

FOREIGN PATENT DOCUMENTS

| | | |
|---|---|---|
| EP | 1 130 257 | 9/2001 |
| EP | 2484586 | 8/2012 |

(Continued)

OTHER PUBLICATIONS

English translation of the abstract for JP 06 249129.
English translation of the abstract for FR 2 862 353.

*Primary Examiner* — Brian M O'Hara
*Assistant Examiner* — Keith L Dixon
(74) *Attorney, Agent, or Firm* — DASCENZO Intellectual Property Law, P.C.

(57) ABSTRACT

Ratcheting shape memory alloy actuators and systems and methods including the same are disclosed herein. The ratcheting shape memory alloy actuators include a ratcheting assembly that is operatively coupled to a first bracket and a shape memory alloy element that is operatively coupled to the ratcheting assembly and to a second bracket. The first bracket is configured to be operatively coupled to a first structure, while the second bracket is configured to be operatively coupled to a second structure. The shape memory alloy element is configured to apply a motive force to the ratcheting assembly upon deformation between a first conformation and a second conformation. The ratcheting assembly is configured to utilize the motive force to selectively adjust an orientation of the first structure relative to the second structure.

22 Claims, 7 Drawing Sheets

(56) References Cited

U.S. PATENT DOCUMENTS

| | | | | |
|---|---|---|---|---|
| 5,975,468 A | * | 11/1999 | Moignier | F03G 7/065 244/172.7 |
| 6,065,934 A | * | 5/2000 | Jacot | F03G 7/065 244/99.8 |
| 6,499,952 B1 | | 12/2002 | Jacot et al. | |
| 7,878,459 B2 | * | 2/2011 | Mabe | B64C 9/32 244/213 |
| 8,118,264 B2 | | 2/2012 | Mabe et al. | |
| 2002/0185932 A1 | | 12/2002 | Gummin et al. | |
| 2009/0143730 A1 | | 6/2009 | De Polo et al. | |
| 2012/0292155 A1 | | 11/2012 | Gunter | |

FOREIGN PATENT DOCUMENTS

| | | |
|---|---|---|
| FR | 2 862 353 | 5/2005 |
| JP | 06 249129 | 9/1994 |

* cited by examiner

RATCHETING SHAPE MEMORY ALLOY ACTUATORS AND SYSTEMS AND METHODS INCLUDING THE SAME

FIELD

The present disclosure relates generally to actuators and more particularly to actuators that include a ratcheting assembly and a shape memory alloy element.

BACKGROUND

One or more actuators may be utilized to change, adjust, control, and/or regulate a relative orientation of two structures that are configured to translate and/or rotate relative to one another. As an illustrative, non-exclusive example, an aircraft may utilize an actuator to change an orientation of one or more actuatable components thereof. As a more specific but still illustrative, non-exclusive example, the actuator may be utilized to open and/or close a main landing gear door of the aircraft.

Traditionally, these actuators may be hydraulic actuators and/or motorized actuators. Hydraulic actuators may utilize a pressurized hydraulic fluid that provides a motive force to change the relative orientation of the two structures. Motorized actuators may utilize an electric motor to provide the motive force.

Hydraulic and/or motorized actuators are relatively complex systems that utilize a large number of moving parts, occupy a significant amount of space, and/or are heavy. In some applications, such as aircraft, simpler, smaller, and/or lighter actuators may be desirable, as these may decrease manufacturing costs, maintenance costs, and/or fuel consumption. Thus, there exists a need for improved actuators and/or for systems and methods that include improved actuators.

SUMMARY

Ratcheting shape memory alloy actuators and systems and methods including the same are disclosed herein. The ratcheting shape memory alloy actuators include a ratcheting assembly that is operatively coupled to a first bracket and a shape memory alloy element that is operatively coupled to the ratcheting assembly and to a second bracket. The first bracket is configured to be operatively coupled to a first structure, while the second bracket is configured to be operatively coupled to a second structure. The shape memory alloy element is configured to apply a motive force to the ratcheting assembly upon deformation between a first conformation and a second conformation. The ratcheting assembly is configured to utilize the motive force to selectively adjust an orientation of the first structure relative to the second structure.

In some embodiments, the actuator further includes a selection mechanism that is configured to selectively control the operation of the ratcheting assembly. In some embodiments, the ratcheting assembly includes a plurality of states and the selecting mechanism is configured to selectively transition the ratcheting assembly among the plurality of states. In some embodiments, the plurality of states includes at least three states.

In some embodiments, the shape memory alloy element is a shape memory alloy torque tube. In some embodiments, the shape memory alloy torque tube includes a cylindrical body that has a first end and a second end. In some embodiments, the first end rotates relative to the second end when the shape memory alloy torque tube deforms between the first conformation and the second conformation. In some embodiments, the shape memory alloy element comprises nickel and titanium.

In some embodiments, the ratcheting assembly is a rotary ratcheting assembly. In some embodiments, the ratcheting assembly is a linear ratcheting assembly. In some embodiments, the actuator further includes a temperature control structure that is configured to selectively transition the shape memory alloy element between the first conformation and the second conformation by regulating a temperature of the shape memory alloy element. In some embodiments, the actuator includes a plurality of shape memory alloy elements. In some embodiments, one or more ratcheting shape memory alloy actuators are operatively coupled to the first structure and to the second structure to form a system that includes the first structure, the second structure, and the one or more ratcheting shape memory alloy actuators.

DESCRIPTION

Figure 1:
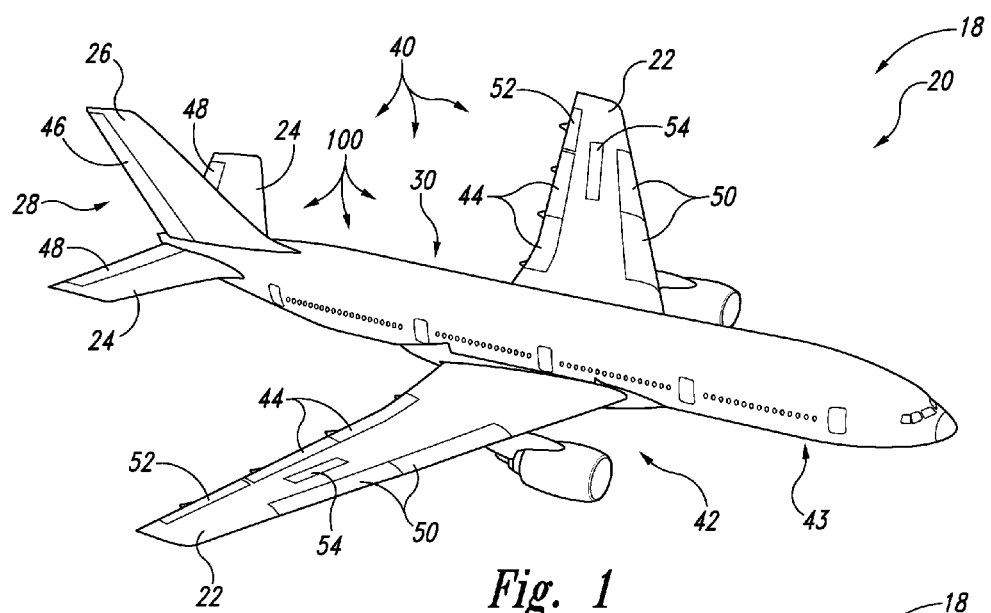
FIG. 1 is a schematic representation of illustrative, non-exclusive examples of an aircraft that may be utilized with and/or may include the systems and methods according to the present disclosure.

FIGS. 1-23 provide illustrative, non-exclusive examples of ratcheting shape memory alloy actuators 100 according to the present disclosure, of components of ratcheting shape memory alloy actuators 100, and/or of systems 18, such as aircraft 20, that include ratcheting shape memory alloy actuators 100. Elements that serve a similar, or at least substantially similar, purpose are labeled with like numbers in each of FIGS. 1-23 and these elements may not be discussed in detail herein with reference to each of FIGS. 1-23. Similarly, all elements may not be labeled in each of FIGS. 1-23 but reference numerals associated therewith may be utilized herein for consistency. Elements, components, and/or features that are discussed herein with reference to one or more of FIGS. 1-23 may be included in and/or utilized with any of FIGS. 1-23 without departing from the scope of the present disclosure.

In general, elements that are likely to be included in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a particular embodiment without departing from the scope of the present disclosure.

Figure 2:
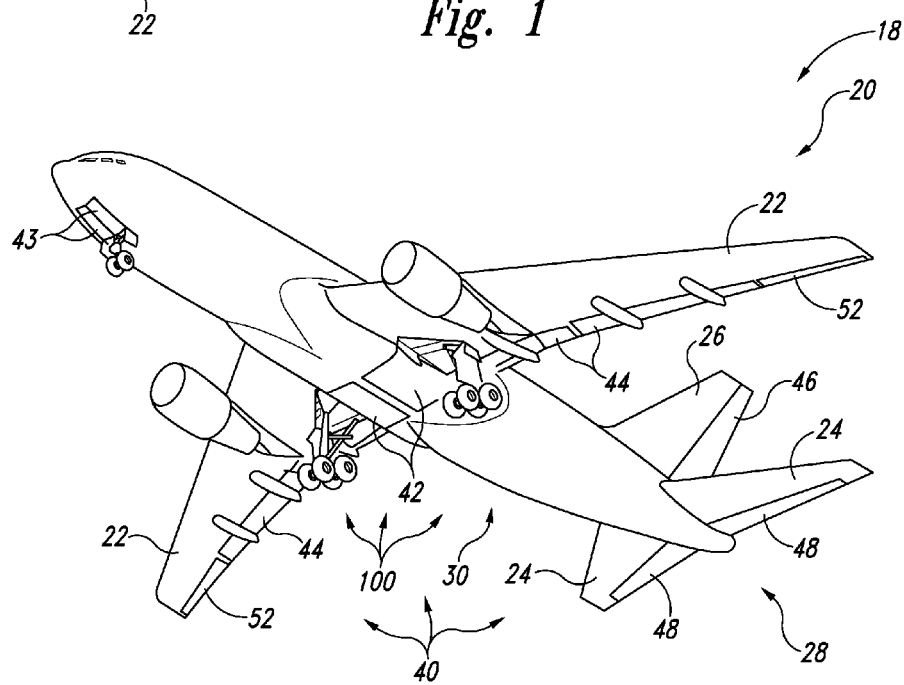
FIG. 2 is another schematic representation of illustrative, non-exclusive examples of an aircraft that may be utilized with and/or may include the systems and methods according to the present disclosure.

FIGS. 1-2 are schematic representations of illustrative, non-exclusive examples of a system 18, such as an aircraft 20, that may be utilized with and/or may include the systems and methods according to the present disclosure. Aircraft 20 includes wings 22 that are attached to a fuselage 30. Aircraft 20 also includes horizontal stabilizers 24 and vertical stabilizer 26 that are attached to a tail 28.

Aircraft 20 further includes a plurality of actuated components 40. Actuated components 40 may include, be associated with, be operatively attached to, be operatively coupled to, be directly coupled to, and/or be actuated by one or more ratcheting shape memory alloy actuators 100 according to the present disclosure, which are discussed in more detail herein. Illustrative, non-exclusive examples of actuated components 40 include any suitable main landing gear door 42, nose landing gear door 43, flap 44 (or trailing edge flap 44), rudder 46, elevator 48, slat 50 (or leading edge slat 50), aileron 52, and/or spoiler 54.

Figure 3:
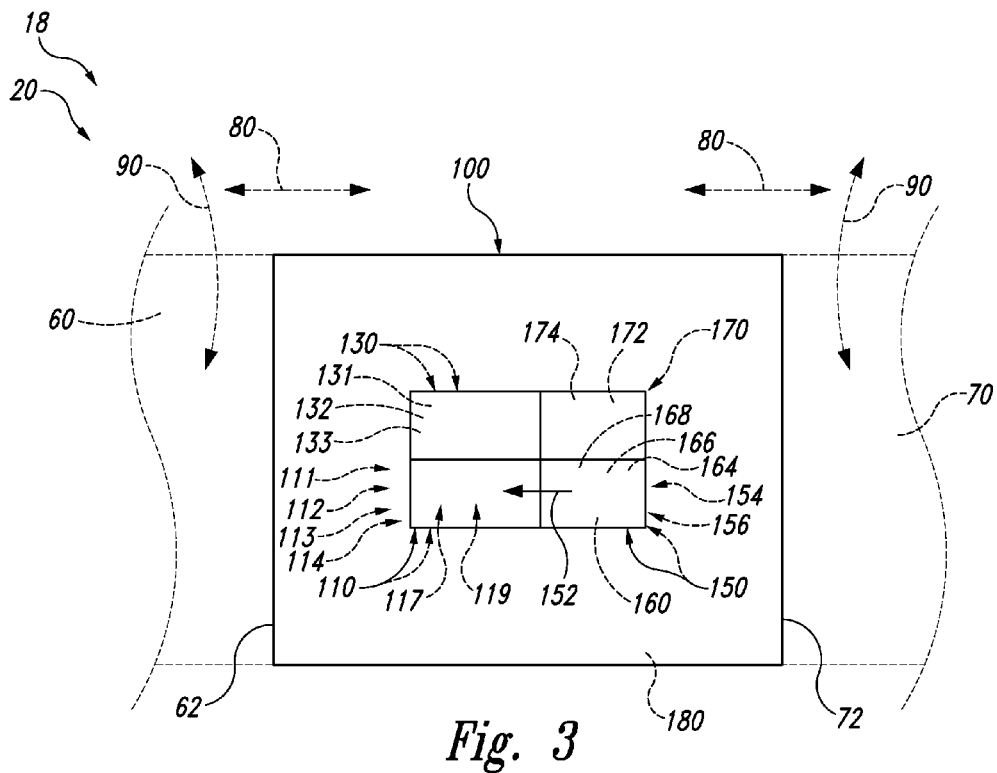
FIG. 3 is a schematic block diagram of an illustrative, non-exclusive example of a ratcheting shape memory alloy actuator according to the present disclosure.

FIG. 3 is a schematic block diagram of an illustrative, non-exclusive example of a ratcheting shape memory alloy actuator 100 according to the present disclosure. Ratcheting shape memory alloy actuator 100 also may be referred to herein as actuator 100 and is configured to adjust, regulate, change, vary, and/or control an orientation of a first structure 60 relative to (or with respect to) a second structure 70. This may include adjusting the orientation of first structure 60 relative to second structure 70 via any suitable translational motion 80 and/or via any suitable rotational motion 90 of first structure 60 and/or of second structure 70.

Actuator 100 includes a first bracket 62 that is configured to be operatively coupled to first structure 60 and a second bracket 72 that is configured to be operatively coupled to second structure 70. Actuator 100 further includes a ratcheting assembly 110 that is operatively coupled to first bracket 62 and a shape memory alloy element 150 that is operatively coupled to ratcheting assembly 110 and that is also operatively coupled to second bracket 72. As discussed in more detail herein, shape memory alloy element 150 is configured to provide a motive force 152 to ratcheting assembly 110 upon, via, and/or during deformation between a first conformation 154 and a second conformation 156. Ratcheting assembly 110 is configured to utilize motive force 152 to selectively adjust, regulate, change, vary, and/or control the orientation of first structure 60 relative to second structure 70, as discussed herein.

As illustrated in dashed lines in FIG. 3, actuator 100 further may include a selection mechanism 130. Selection mechanism 130 may be configured to selectively control the operation of ratcheting assembly 110. Additionally or alternatively, actuator 100 also may include a temperature control structure 170. Temperature control structure 170 may be configured to selectively transition shape memory alloy element 150 between first conformation 154 and second conformation 156, such as by regulating, changing, adjusting, and/or controlling a temperature of shape memory alloy element 150, by heating shape memory alloy element 150, and/or by cooling shape memory alloy element 150. As also illustrated in dashed lines in FIG. 3, actuator 100 further may include a biasing mechanism 180. When actuator 100 includes biasing mechanism 180, shape memory alloy element 150 may be configured to transition, translate, rotate, and/or move first structure 60 relative to second structure 70 in a first direction, and biasing mechanism 180 may be configured to transition, translate, rotate, and/or move the first structure relative to the second structure in a second direction that is opposed to the first direction. This may include transitioning, translating, rotating, and/or moving first structure 60 relative to second structure 70, transitioning, translating, rotating, and/or moving second structure 70 relative to first structure 60, and/or transitioning, translating, rotating, and/or moving both first structure 60 and second structure 70.

Shape memory alloy element 150 may include any suitable structure that is configured to repeatedly deform between first conformation 154 and the second conformation 156 to apply motive force 152 to ratcheting assembly 110. As an illustrative, non-exclusive example, shape memory alloy element 150 may include and/or be a shape memory alloy torque tube 160. Shape memory alloy torque tube 160 may include a cylindrical body 164 that defines a first end 166 and a second end 168, with first end 166 being spaced apart from second end 168 along a longitudinal axis of cylindrical body 164.

First conformation 154 is different from second conformation 156. As an illustrative, non-exclusive example, and when shape memory alloy element 150 includes (or is) shape memory alloy torque tube 160, first end 166 may rotate relative to second end 168 when shape memory alloy torque tube 160 transitions between first conformation 154 and second conformation 156. Thus, shape memory alloy torque tube 160 may be configured to provide a rotational motive force 152 to ratcheting assembly 110.

Shape memory alloy element 150 may be formed from any suitable material and/or may include any suitable material (or materials) of construction. As illustrative, non-exclusive examples, shape memory alloy element 150 may include hafnium, palladium, platinum, copper, aluminum, nickel, titanium, zinc, gold, and/or iron. As a more specific but still illustrative, non-exclusive example, shape memory alloy element 150 may comprise a nickel and titanium alloy that exists in a martensite phase at (relatively) lower temperatures and in an austenite phase at (relatively) higher temperatures.

The exact temperature (or temperature range) for transitioning between the martensite and austenite phases may be a function of the exact composition of shape memory alloy element 150. Illustrative, non-exclusive examples of (relatively) lower temperatures include temperatures of less than −20° C., less than −15° C., less than −10° C., less than −5° C., less than 0° C., less than 5° C., less than 10° C., less than 15° C., less than 20° C., less than 25° C., less than 30° C., less than 35° C., less than 40° C., less than 45° C., or less than 50° C. Illustrative, non-exclusive examples of (relatively) higher temperatures include temperatures of at least −10° C., at least −5° C., at least 0° C., at least 5° C., at least 10° C., at least 15° C., at least 20° C., at least 25° C., at least 30° C., at least 35° C., at least 40° C., at least 45° C., at least 50° C., at least 55° C., or at least 60° C.

Ratcheting assembly 110 may include any suitable structure that is configured to selectively utilize motive force 152 to adjust the orientation of first structure 60 relative to second structure 70. As an illustrative, non-exclusive example, ratcheting assembly 110 may include and/or be a rotary ratcheting assembly 119, as discussed in more detail herein with reference to FIG. 22. As another illustrative, non-exclusive example, ratcheting assembly 110 also may include and/or be a linear ratcheting assembly 117, as discussed in more detail herein with reference to FIG. 23. Regardless of the specific construction of ratcheting assembly 110, and as discussed, the ratcheting assembly is configured to selectively translate and/or rotate first structure 60 relative to second structure 70 responsive to receipt of motive force 152 from shape memory alloy element 150.

Selection mechanism 130 may include any suitable structure that is configured to selectively control the operation of ratcheting assembly 110. This may include selectively controlling the application of motive force 152 between first structure 60 and second structure 70 and/or selectively engaging and/or disengaging ratcheting assembly 110 to selectively adjust the orientation of first structure 60 relative to second structure 70.

As an illustrative, non-exclusive example, ratcheting assembly 110 may include (or define) a plurality of states (or operating states), and selection mechanism 130 may be configured to selectively transition ratcheting assembly 110 between (or among) the plurality of states. It is within the scope of the present disclosure that the plurality of states may include any suitable number of states.

As an illustrative, non-exclusive example, ratcheting assembly 110 may include, define, and/or be placed in a first state 111. As an illustrative, non-exclusive example, ratcheting assembly 110 may include a first selecting element 131, such as a first pawl 118, that is configured to retain the ratcheting assembly in the first state.

When in first state 111, ratcheting assembly 110 is configured to utilize motive force 152 to change the orientation of first structure 60 relative to second structure 70 when shape memory alloy element 150 undergoes a first deformation from first conformation 154 to second conformation 156. However, and when ratcheting assembly 110 is in first state 111, the ratcheting assembly is configured to dissipate motive force 152 (i.e., not to utilize motive force 152 to change the orientation of first structure 60 relative to second structure 70) when shape memory alloy element 150 undergoes a second deformation from second conformation 156 to first conformation 154.

Additionally or alternatively, and when in first state 111, ratcheting assembly 110 is configured to operatively couple first structure 60 to second structure 70 via shape memory alloy element 150 when shape memory alloy element 150 undergoes the first deformation. However, and when in first state 111, ratcheting assembly 110 is configured to operatively decouple shape memory alloy element 150 from first structure 60 and/or from second structure 70 when shape memory alloy element 150 undergoes the second deformation.

As another illustrative, non-exclusive example, ratcheting assembly 110 additionally or alternatively may include, may define, and/or may be placed in a second state 112. As an illustrative, non-exclusive example, ratcheting assembly 110 may include a second selecting element 132, such as a second pawl 118, that is configured to retain the ratcheting assembly in the second state. It is within the scope of the present disclosure that second selecting element 132 may be different from first selecting element 131. However, it is also within the scope of the present disclosure that second selecting element 132 is, or is the same as, first selecting element 131.

When in second state 112, ratcheting assembly 110 is configured to utilize motive force 152 to change the orientation of first structure 60 relative to second structure 70 when shape memory alloy element 150 undergoes the second deformation. However, and when ratcheting assembly 110 is in second state 112, the ratcheting assembly is configured to dissipate motive force 152 (i.e., not to utilize motive force 152 to change the orientation of first structure 60 relative to second structure 70) when shape memory alloy element undergoes the first deformation.

Additionally or alternatively, and when in second state 112, ratcheting assembly 110 is configured to operatively couple first structure 60 to second structure 70 via shape memory alloy element 150 when shape memory alloy element 150 undergoes the second deformation. However, and when in second state 112, ratcheting assembly 110 is configured to operatively decouple shape memory alloy element 150 from first structure 60 and/or from second structure 70 when shape memory alloy element 150 undergoes the first deformation.

As yet another illustrative, non-exclusive example, ratcheting assembly 110 additionally or alternatively may include, define, and/or be placed in a third state 113. As an illustrative, non-exclusive example, ratcheting assembly 110 may include a third selecting element 133, such as a stop 133 and/or a third pawl 133, that is configured to retain the ratcheting assembly in the third state. It is within the scope of the present disclosure that third selecting element 133 may be different from first selecting element 131 and/or may be different from second selecting element 132. However, it is also within the scope of the present disclosure that third selecting element 133 may be, or be the same as, first selecting element 131 and/or second selecting element 132.

When in third state 113, ratcheting assembly 110 may restrict, resist, limit, block, and/or stop motion of first structure relative to second structure regardless of the presence, or absence, of motive force 152. Additionally or alternatively, and when in third state 113, ratcheting assembly 110 also may restrict, resist, limit, block, and/or stop deformation of shape memory alloy element 150 between first conformation 154 and second conformation 156.

As another illustrative, non-exclusive example, ratcheting assembly 110 additionally or alternatively may include, may define, and/or may be placed in a fourth state 114. When in fourth state 114, ratcheting assembly 110 may be configured to dissipate motive force 152 (i.e., not to utilize motive force 152 to change the relative orientation of first structure 60 and second structure 70) when shape memory alloy element 150 undergoes the first deformation and when shape memory alloy element 150 undergoes the second deformation. Additionally or alternatively, and when in fourth state 114, ratcheting assembly 110 may be configured to operatively decouple shape memory alloy element 150 from first structure 60 and/or from second structure 70 when shape memory alloy element 150 undergoes both the first deformation and the second deformation.

Selection mechanism 130 may be triggered, may be actuated, and/or may select among the plurality of different states of ratcheting assembly 110 in any suitable manner. As illustrative, non-exclusive examples, selection mechanism 130 may include and/or be a mechanically actuated selection mechanism, a hydraulically actuated selection mechanism, a pneumatically actuated selection mechanism, and/or an electrically actuated selection mechanism. As additional illustrative, non-exclusive examples, selection mechanism 130 also may include and/or be a manually actuated selection mechanism and/or an automatically actuated selection mechanism.

Temperature control structure 170 may include any suitable structure that may be configured to regulate the temperature of shape memory alloy element 150 to selectively transition the shape memory alloy element between first conformation 154 and second conformation 156. As an illustrative, non-exclusive example, temperature control structure 170 may include and/or be a heating element 172. Illustrative, non-exclusive examples of heating element 172 include any suitable electric heating element, resistive heating element, Peltier device, and/or heat exchange structure. As another illustrative, non-exclusive example, temperature control structure 170 also may include and/or be a cooling element 174. Illustrative, non-exclusive examples of cooling element 174 include any suitable electric cooling element, Peltier device, refrigeration structure, and/or heat exchange structure.

Biasing mechanism 180 may include any suitable structure that is configured to transition first structure 60 relative to second structure 70 in at least one direction. Illustrative, non-exclusive examples of biasing mechanism 180 include any suitable spring, strut, compressed gas reservoir, and/or elastomeric material.

First structure 60 and second structure 70 may include any suitable structures that are configured to transition, translate, move, and/or rotate relative to one another. As illustrative, non-exclusive examples, one of first structure 60 and second structure 70 may include and/or be an aircraft, a wing of an aircraft, a horizontal stabilizer of an aircraft, a vertical stabilizer of an aircraft, a tail of an aircraft, and/or a fuselage of an aircraft (as illustrated in FIGS. 1-2). As additional illustrative, non-exclusive examples, the other of first structure 60 and second structure 70 may include and/or be an actuated component, such as a door, a main landing gear door, a nose landing gear door, a flap, a trailing edge flap, a spoiler, an elevator, a leading edge slat, and/or an aileron.

Figure 4:
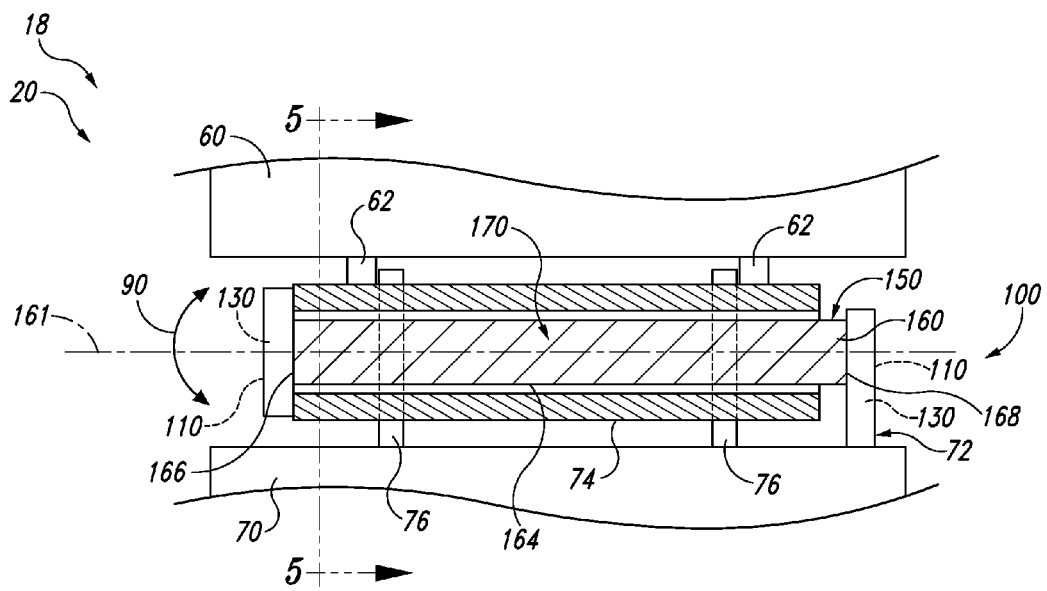
FIG. 4 is a longitudinal cross-sectional view of an illustrative, non-exclusive example of a ratcheting shape memory alloy actuator according to the present disclosure.

FIG. 4 is a longitudinal cross-sectional view of an illustrative, non-exclusive example of a ratcheting shape memory alloy actuator 100 according to the present disclosure. Ratcheting shape memory alloy actuator 100 of FIG. 4 includes a shape memory alloy element 150, in the form of a shape memory alloy torque tube 160, and is located within a hinge pin 74 that is supported by and rotates within a plurality of supports 76. Shape memory alloy torque tube 160 defines a longitudinal axis 161. Ratcheting shape memory alloy actuator 100 also includes a first bracket 62, which operatively attaches hinge pin 74 to a first structure 60, and a second bracket 72, which operatively attaches shape memory alloy element 150 to a second structure 70.

Ratcheting shape memory alloy actuator 100 further includes a ratcheting assembly 110, a selection mechanism 130, and a temperature control structure 170. Ratcheting assembly 110 and selection mechanism 130 are illustrated in dashed lines to indicate that these structures may be operatively attached to either a first end 166 or a second end 168 of a cylindrical body 164 that comprises shape memory alloy torque tube 160. During operation, and as discussed in more detail herein with reference to FIGS. 5-8, ratcheting shape memory alloy actuator 100 is configured to impart rotational motion 90 between first structure 60 and second structure 70.

FIGS. 5-8 are transverse cross-sectional views of ratcheting shape memory alloy actuator 100 of FIG. 4 taken along line 5-5 of FIG. 4. In the illustrative, non-exclusive example of FIG. 5, first structure 60 and second structure 70 initially are on opposed (or at least substantially opposed) sides of ratcheting shape memory alloy actuator 100, shape memory alloy element 150 is in a first conformation 154, and an arbitrarily chosen reference point 162 on shape memory alloy element 150 is directly opposed to an arbitrarily chosen reference point 75 on hinge pin 74.

Figure 5:
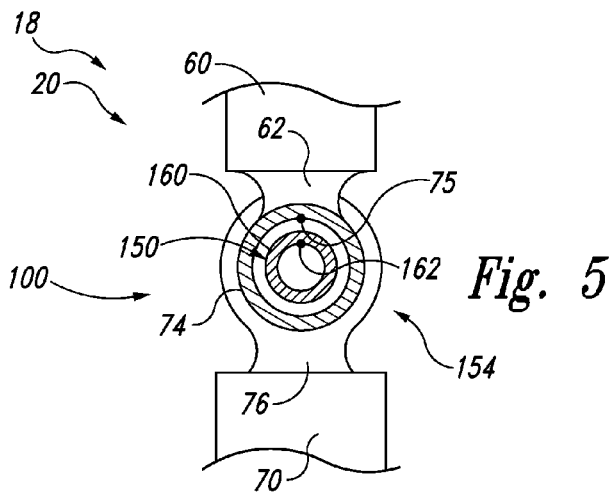
FIG. 5 is a transverse cross-sectional view of the ratcheting shape memory alloy actuator of FIG. 4 taken along line 5-5 of FIG. 4.
Figure 6:
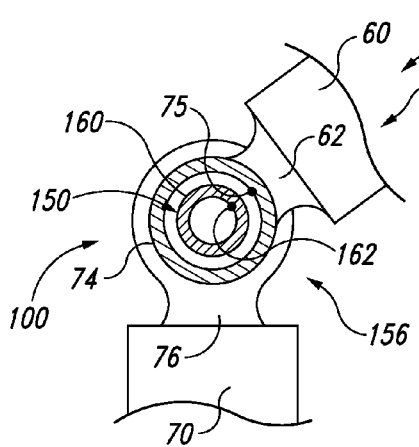
FIG. 6 is another transverse cross-sectional view of the ratcheting shape memory alloy actuator of FIG. 5.

Subsequently, and as illustrated in FIG. 6, shape memory alloy element 150 transitions to a second conformation 156. During this transition, ratcheting assembly 110 of ratcheting shape memory alloy actuator 100 (as illustrated in FIGS. 3-4) is configured to utilize (or is in a state, such as first state 111, that utilizes) motive force 152 (as illustrated in FIG. 3) to rotate first structure 60 and second structure 70 relative to one another. Thus, and subsequent to shape memory alloy element 150 transitioning to second conformation 156, reference points 75 and 162 remain opposed to one another but are rotated in a clockwise direction relative to their orientation as illustrated in FIG. 5. In addition, and as also illustrated in FIG. 6, first structure 60 is rotated a similar amount in the clockwise direction relative to second structure 70.

Figure 7:
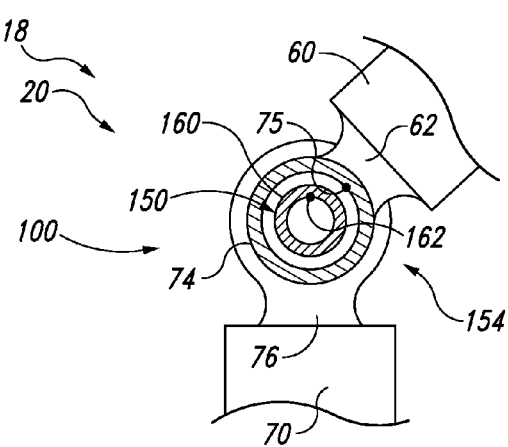
FIG. 7 is another transverse cross-sectional view of the ratcheting shape memory alloy actuator of FIGS. 5-6.

Then, and as illustrated in FIG. 7, shape memory alloy element 150 may be transitioned (or returned) to first conformation 154. During this transition, ratcheting assembly 110 of ratcheting shape memory alloy actuator 100 (as illustrated in FIGS. 3-4) is configured to dissipate (or is in a state, such as first state 111, that dissipates) motive force 152 (as illustrated in FIG. 3) without relative motion between first structure 60 and second structure 70. Thus, the relative orientation of first structure 60 and second structure 70, as well as a location of reference point 75, is unchanged between FIGS. 6 and 7. However, and as illustrated in FIG. 7, reference point 162 rotates in a counterclockwise direction and returns (at least substantially) to its original position, as illustrated in FIG. 5.

Figure 8:
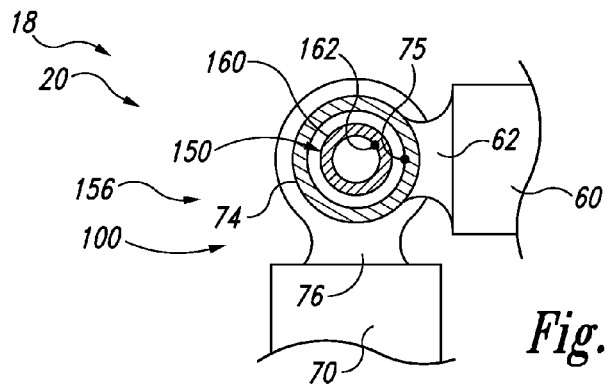
FIG. 8 is another transverse cross-sectional view of the ratcheting shape memory alloy actuator of FIGS. 5-7.

Subsequently, and as illustrated in FIG. 8, shape memory alloy element 150 may be transitioned (or returned) to second conformation 156. During this transition, ratcheting assembly 110 of ratcheting shape memory alloy actuator 100 (as illustrated in FIGS. 3-4) continues to be configured to utilize (or is in a state, such as first state 111, that utilizes) motive force 152 (as illustrated in FIG. 3) to rotate first structure 60 and second structure 70 relative to one another. Thus, and subsequent to shape memory alloy element 150 transitioning to second conformation 156, reference points 75 and 162 are both rotated clockwise relative to their orientation as illustrated in FIG. 7. In addition, and as also illustrated in FIG. 8, first structure 60 is rotated an additional amount in the clockwise direction relative to second structure 70.

The above-described process may be repeated any suitable number of times to rotate first structure 60 in the clockwise direction relative to second structure 70 by any suitable amount. In addition, the transition between first conformation 154 and second conformation 156 may define any suitable angular rotation of reference point 162. Furthermore, and as discussed in more detail herein with reference to FIG. 3, ratcheting assembly 110 also may be placed in second state 112, which would rotate first structure 60 and second structure 70 relative to one another in the counterclockwise direction (i.e., when shape memory alloy element transitions from second conformation 156 to first conformation 154), may be placed in third state 113, which would fix a relative orientation of first structure 60 and second structure 70 relative to one another (or resist relative motion of first structure 60 relative to second structure 70), and/or in fourth state 114, which would permit relative motion between first structure 60 and second structure 70 regardless of the conformation of shape memory alloy element 150.

Figure 9:
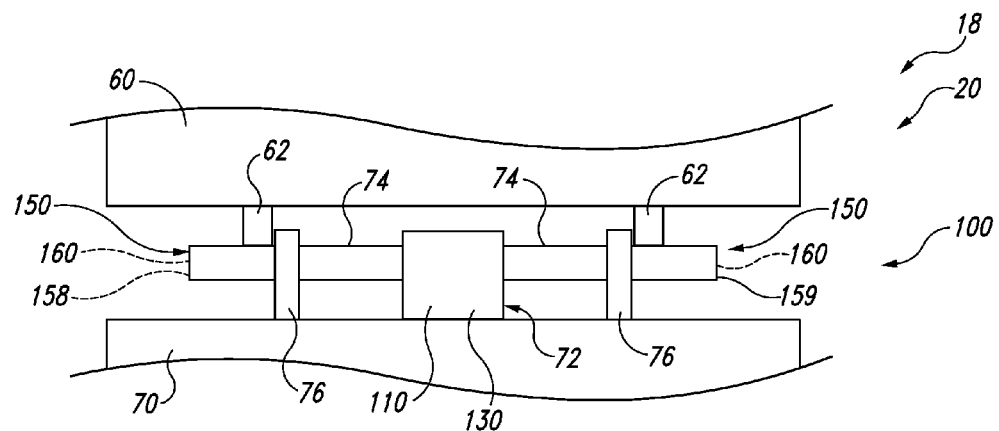
FIG. 9 is a side view of a system that includes another ratcheting shape memory alloy actuator according to the present disclosure.

FIG. 9 is a side view of a system 18 that includes another ratcheting shape memory alloy actuator 100 according to the present disclosure. Ratcheting shape memory alloy actuator 100 of FIG. 9 is substantially similar to ratcheting shape memory alloy actuator 100 of FIGS. 4-8. However ratcheting shape memory alloy actuator 100 of FIG. 9 includes two shape memory alloy elements 150 (i.e., first shape memory alloy element 158 and second shape memory alloy element 159), with both shape memory alloy elements 150 being operatively coupled to a ratcheting assembly 110. As illustrated, ratcheting assembly 110 may be located between and may operatively couple first shape memory alloy element 158 to second shape memory alloy element 159.

It is within the scope of the present disclosure that first shape memory alloy element 158 may be configured to provide a first motive force to ratcheting assembly 110 and that second shape memory alloy element 159 may be configured to provide a second motive force to ratcheting assembly 110. The first motive force and the second motive force may complement, or supplement, each other (such as when the first motive force and the second motive force are applied to ratcheting assembly 110 in the same, or at least substantially the same, direction). Under these conditions, the presence of first shape memory alloy element 158 and second shape memory alloy element 159 may increase an effective magnitude of the motive force that may be applied by ratcheting shape memory alloy actuator 100, thereby increasing a size, weight, and/or mass of first structure 60 and/or of second structure 70 that may be moved thereby.

Additionally or alternatively, it is also within the scope of the present disclosure that the first motive force and the second motive force may be opposed to one another (such as when the first motive force and the second motive force are applied to ratcheting assembly 110 in opposed, or at least substantially opposed, directions). Under these conditions, first shape memory alloy element 158 may be utilized to transition, translate, move, and/or rotate first structure 60 relative to second structure 70 in a first direction, while second shape memory alloy element 159 may be utilized to transition, translate, move, and/or rotate first structure 60 relative to second structure 70 in a second direction that is opposed to the first direction.

A motive force that is generated, or produced, by shape memory alloy elements 150 often may be greater when transitioning to one of the first conformation and the second conformation and weaker when transitioning to the other of the first conformation and the second conformation. Under these conditions, the presence of first shape memory alloy element 158 and second shape memory alloy element 159 may provide for selection of appropriate, or desired, magnitude of the motive force that is applied to ratcheting assembly 110 during transitioning in the first direction and in the second direction.

Figure 10:
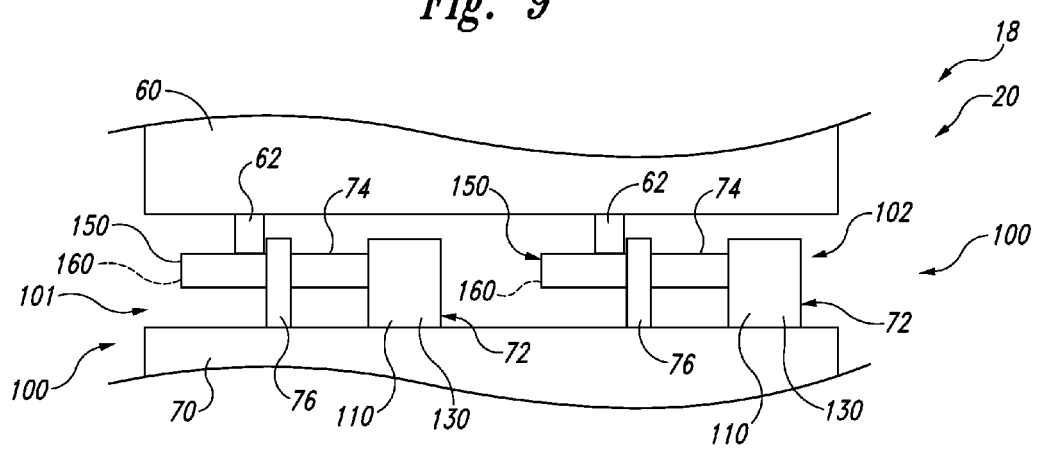
FIG. 10 is a side view of a system that includes a plurality of ratcheting shape memory alloy actuators according to the present disclosure.

FIG. 10 is a side view of a system 18 that includes a plurality of ratcheting shape memory alloy actuators 100 according to the present disclosure (such as a first ratcheting shape memory alloy actuator 101 and a second ratcheting shape memory alloy actuator 102). Ratcheting shape memory alloy actuators 100 of FIG. 10 may be at least substantially similar to ratcheting shape memory alloy actuators 100 of FIGS. 4-8.

It is within the scope of the present disclosure that first ratcheting shape memory alloy actuator 101 may be configured to complement, or supplement, second ratcheting shape memory alloy actuator 102. Under these conditions, first ratcheting shape memory alloy actuator 101 and second ratcheting shape memory alloy actuator 102 both may be configured to transition, translate, move, and/or rotate first structure 60 relative to second structure 70 in the same direction.

Additionally or alternatively, it is also within the scope of the present disclosure that first ratcheting shape memory alloy actuator 101 and second ratcheting shape memory alloy actuator 102 may be configured to operate in opposition to one another. Under these conditions, first ratcheting shape memory alloy actuator 101 may be configured to transition, translate, move, and/or rotate first structure 60 relative to second structure 70 in a first direction, and second ratcheting shape memory alloy actuator 102 may be configured to transition, translate, move, and/or rotate first structure 60 relative to second structure 70 in a second direction that is opposed to the first direction.

Figure 11:
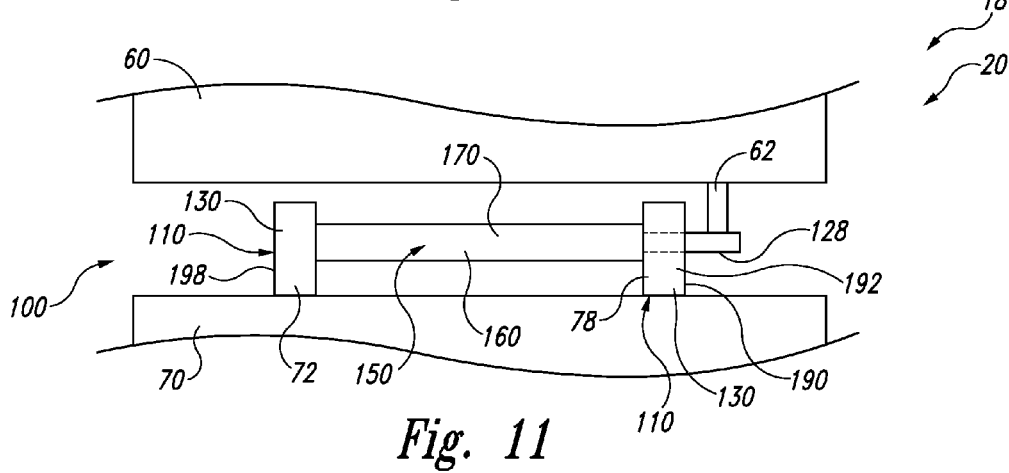
FIG. 11 is an illustrative, non-exclusive example of another ratcheting shape memory alloy actuator according to the present disclosure that includes a first ratcheting assembly and a second ratcheting assembly.

FIG. 11 is an illustrative, non-exclusive example of another ratcheting shape memory alloy actuator 100 according to the present disclosure that includes a first 190 ratcheting assembly 110 and a second 198 ratcheting assembly 110. First 190 ratcheting assembly 110 also may be referred to herein as a first ratcheting assembly 190. Similarly, second 198 ratcheting assembly 110 also may be referred to herein as a second ratcheting assembly 198. Ratcheting shape memory alloy actuator 100 also includes a shape memory alloy element 150 in the form of a shape memory alloy torque tube 160, which is configured to rotate upon transitioning between a first conformation 154 and a second conformation 156 (as illustrated in FIGS. 12-21).

In FIG. 11, first ratcheting assembly 190 is operatively coupled to a first bracket 62 via a rotating extension 128. First bracket 62 may be operatively coupled to a first structure 60. Rotating extension 128 is operatively, or even directly, coupled to shape memory alloy torque tube 160 and is configured to rotate with shape memory alloy torque tube 160 when the shape memory alloy torque tube transitions between the first conformation and the second conformation. Shape memory alloy torque tube 160 is located between and operatively coupled to first ratcheting assembly 190 and second ratcheting assembly 198, and second ratcheting assembly 198 is located between and operatively coupled to shape memory alloy torque tube 160 and a second bracket 72, which may be operatively coupled to a second structure 70. Thus, shape memory alloy torque tube 160 also is located between and operatively coupled to first ratcheting assembly 190 and second bracket 72.

First ratcheting assembly 190 includes a first ratchet housing 192. First ratchet housing 192 is configured to support rotating extension 128 and/or shape memory alloy torque tube 160, and first ratcheting assembly 190 is configured to selectively permit rotation of rotating extension 128 and/or shape memory alloy torque tube 160 relative to first ratchet housing 192.

First ratcheting assembly 190 further includes a third bracket 78. Third bracket 78 is operatively coupled to and/or is defined by first ratchet housing 192. In addition, third bracket 78 is configured to be operatively coupled to second structure 70 and is located between rotating extension 128 and/or first ratchet housing 192 and second structure 70 when third bracket 78 is operatively coupled to second structure 70.

As also illustrated in FIG. 11, ratcheting shape memory alloy actuator 100 also may include a temperature control structure 170. In addition, first ratcheting assembly 190 and/or second ratcheting assembly 198 may include respective selection mechanisms 130. Illustrative, non-exclusive examples of temperature control structure 170 and/or selection mechanisms 130 are discussed herein.

FIGS. 12, 14, 16, 18, and 20 are schematic side views illustrating operation of a portion of ratcheting shape memory alloy actuator 100 of FIG. 11, while FIGS. 13, 15, 17, 19, and 21 are schematic end views of rotating extension 128 in the various conformations that are illustrated in FIGS. 12, 14, 16, 18, and 20, respectively. In FIGS. 12, 14, 16, 18, and 20, ratcheting shape memory alloy actuator 100 includes first ratcheting assembly 190 and second ratcheting assembly 198, and first ratcheting assembly 190 includes rotating extension 128.

Figure 12:
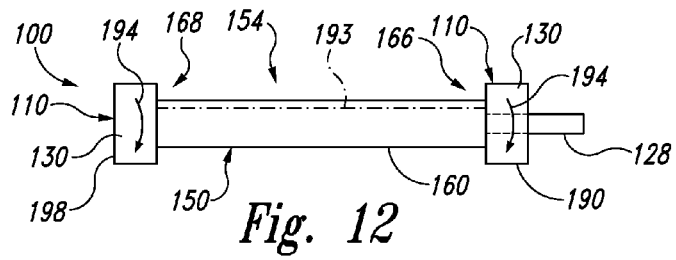
FIG. 12 is a schematic side view illustrating operation of the ratcheting shape memory alloy actuator of FIG. 11.
Figure 13:
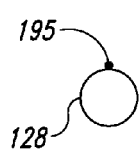
FIG. 13 is a schematic end view of the ratcheting shape memory alloy actuator of FIG. 12.

In FIG. 12, rotating shape memory alloy torque tube 160 is in a first conformation 154, and an arbitrary reference line 193 extends horizontally across a length thereof. In addition, both first ratcheting assembly 190 and second ratcheting assembly 198 are configured to permit rotation of shape memory alloy torque tube 160 relative thereto in a first direction 194 and to restrict rotation of shape memory alloy torque tube 160 in a direction that is opposed to first direction 194 (i.e. second direction 196 of FIGS. 18 and 20-21). In addition, and as illustrated in FIG. 13, an arbitrary reference point 195 on rotating extension 128 may be oriented as shown.

Figure 14:
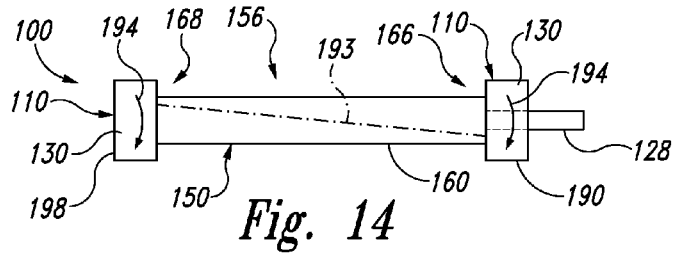
FIG. 14 is a schematic side view illustrating operation of the ratcheting shape memory alloy actuator of FIGS. 11-12.

Then, and as illustrated in FIG. 14, shape memory alloy torque tube 160 is deformed from first conformation 154 to a second conformation 156. This deformation may be accomplished via heating of shape memory alloy torque tube 160, as discussed in more detail herein. In the illustrative, non-exclusive example of FIG. 14, this deformation includes rotation of a first end 166 of shape memory alloy torque tube 160 in first direction 194 relative to a second end 168 of shape memory alloy torque tube 160.

Figure 15:
FIG. 15 is a schematic end view of the ratcheting shape memory alloy actuator of FIG. 14.

During this deformation, first ratcheting assembly 190 permits rotation of first end 166 in first direction 194. However, second ratcheting assembly 198 restricts rotation of second end 168 in the direction that is opposed to first direction 194. Thus, first end 166 rotates in first direction 194, while second end 168 remains (at least substantially) fixed. This is illustrated in FIG. 14 by arbitrary reference line 193, which extends (at least substantially) diagonally across the length of shape memory alloy torque tube 160, with a portion that is proximal to second end 168 remaining fixed in space, while a portion that is proximal to first end 166 is rotated in first direction 194 when compared to FIG. 12. This is also illustrated in FIG. 15, with arbitrary reference point 195 being rotated in first direction 194 relative to FIG. 13.

Figure 16:
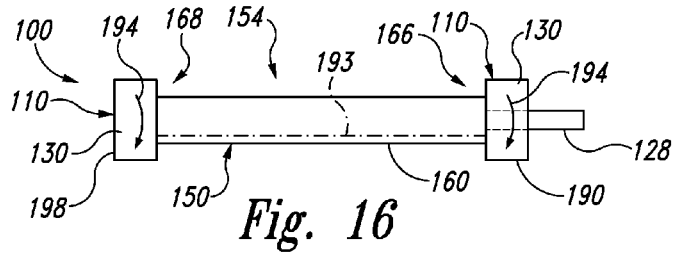
FIG. 16 is a schematic side view illustrating operation of the ratcheting shape memory alloy actuator of FIGS. 11-12 and 14.
Figure 17:
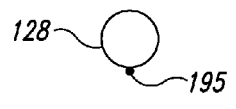
FIG. 17 is a schematic end view of the ratcheting shape memory alloy actuator of FIG. 16.

Subsequently, and as illustrated in FIG. 16, shape memory alloy torque tube 160 may be returned to first conformation 154 via deformation thereof. This may include rotating second end 168 of shape memory alloy torque tube 160 in first direction 194 relative to first end 166. During this deformation, second ratcheting assembly 198 permits rotation of second end 168 in first direction 194. However, first ratcheting assembly 190 restricts rotation of first end 166 in the direction that is opposed to first direction 194. Thus, second end 168 rotates in first direction 194, while first end 166 remains (at least substantially) fixed. This is illustrated by arbitrary reference line 193 returning to an (at least substantially) horizontal orientation. This is also illustrated in FIG. 17, with arbitrary reference point 195 remaining (at least substantially) fixed relative to FIG. 15.

This process may be repeated any suitable number of times to rotate shape memory alloy torque tube 160 and/or rotating extension 128 relative to first ratcheting assembly 190 and/or second ratcheting assembly 198 in first direction 194. This may include rotating shape memory alloy torque tube 160 and/or rotating extension 128 to any suitable angle and/or any suitable number of revolutions relative to ratcheting assemblies 110.

Figure 18:
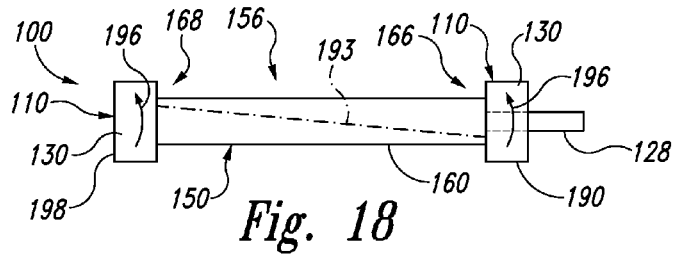
FIG. 18 is a schematic side view illustrating operation of the ratcheting shape memory alloy actuator of FIGS. 11-12, 14, and 16.

Additionally or alternatively, ratcheting shape memory alloy actuator 100 also may be configured to rotate rotating extension 128 in second direction 196, as illustrated in FIGS. 18-21. Therein, first ratcheting assembly 190 and second ratcheting assembly 198 are configured to permit rotation of shape memory alloy torque tube 160 relative thereto in second direction 196 and to restrict rotation of shape memory alloy torque tube 160 in first direction 194 (as illustrated in FIGS. 12-16). Starting from the configuration of FIG. 16, and as illustrated in FIG. 18, shape memory alloy torque tube 160 may be deformed from first conformation 154 to second conformation 156.

Figure 19:
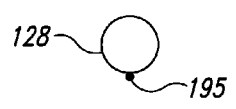
FIG. 19 is a schematic end view of the ratcheting shape memory alloy actuator of FIG. 18.
Figure 20:
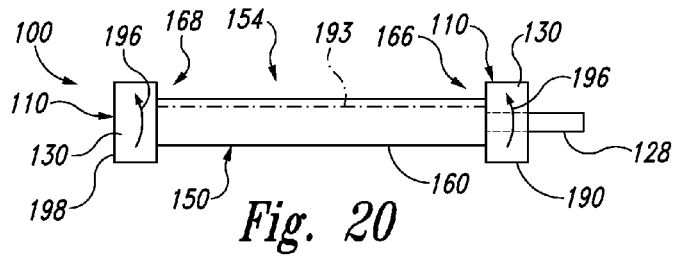
FIG. 20 is a schematic side view illustrating operation of the ratcheting shape memory alloy actuator of FIGS. 11-12, 14, 16, and 18.
Figure 21:
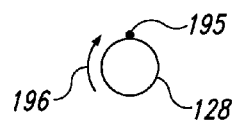
FIG. 21 is a schematic end view of the ratcheting shape memory alloy actuator of FIG. 20.

During this deformation, second ratcheting assembly 198 permits rotation of second end 168 in second direction 196. However, first ratcheting assembly 190 resists rotation of first end 166 in a direction that is opposed to second direction 196 (i.e., first direction 194 of FIGS. 12-16). Thus, second end 168 rotates in second direction 196, while first end 166 remains (at least substantially) fixed. This is illustrated in FIG. 18 by arbitrary reference line 193, which extends (at least substantially) diagonally across the length of shape memory alloy torque tube 160, with a portion that is proximal to first end 166 remaining fixed in space (relative to FIG. 16), while a portion that is proximal to second end 168 is rotated in second direction 196. This is also illustrated in FIG. 19, with arbitrary reference point 195 remaining (at least substantially) fixed in space relative to FIG. 17. Subsequently, and as illustrated in FIG. 20, shape memory alloy torque tube 160 may be returned to first conformation 154 via deformation thereof. This may include rotating first end 166 of shape memory alloy torque tube 160 in second direction 196 relative to second end 168. During this deformation, first ratcheting assembly 190 permits rotation of first end 166 in second direction 196. However, second ratcheting assembly 198 restricts rotation of second end 168 in the direction that is opposed to second direction 196. Thus, first end 166 rotates in second direction 196, while second end 168 remains (at least substantially) fixed. This is illustrated by arbitrary reference line 193 returning to an (at least substantially) horizontal orientation. This is also illustrated in FIG. 21, with arbitrary reference point 195 being rotated in second direction 196 relative to FIG. 19.

This process also may be repeated any suitable number of times to rotate shape memory alloy torque tube 160 and/or rotating extension 128 relative to first ratcheting assembly 190 and/or second ratcheting assembly 198 in second direction 196. This may include rotating shape memory alloy torque tube 160 and/or rotating extension 128 to any suitable angle and/or any suitable number of revolutions relative to ratcheting assemblies 110.

Figure 22:
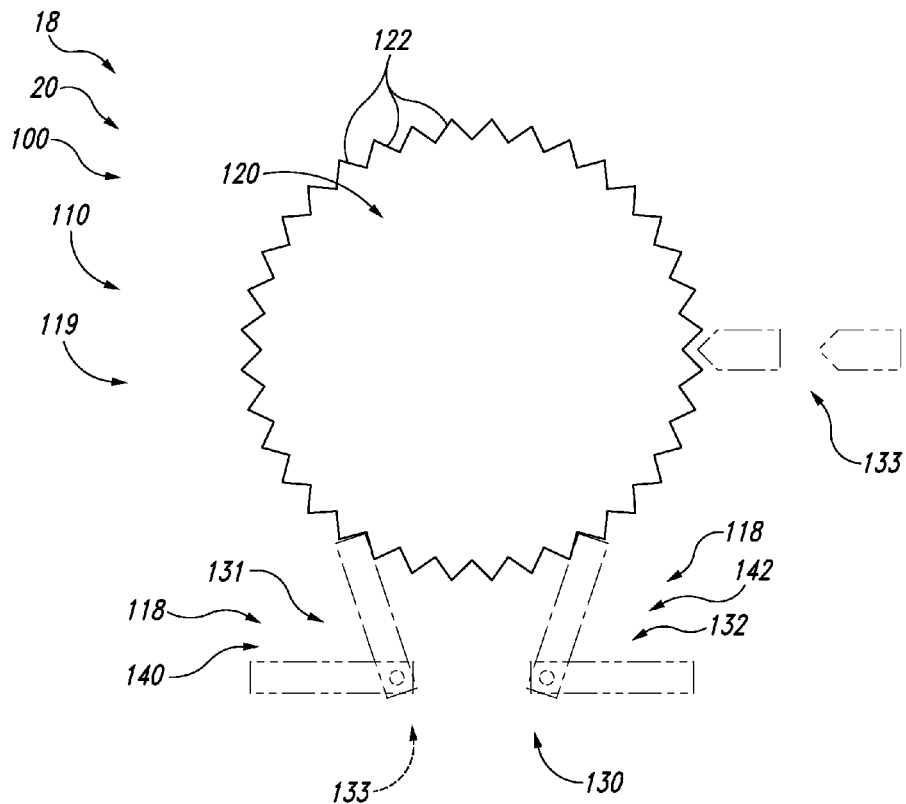
FIG. 22 is a schematic representation of a rotary ratcheting assembly that may be utilized with and/or included in the systems and methods according to the present disclosure.

FIG. 22 is a schematic representation of a rotary 119 ratcheting assembly 110 (or a rotary ratcheting assembly 119) that may be utilized with and/or included in the systems and methods according to the present disclosure. Rotary ratcheting assembly 119 includes a gear 120, which includes a plurality of teeth 122, and a selection mechanism 130. One of gear 120 and selection mechanism 130 may be operatively attached to first structure 60 of FIGS. 3-11, while the other of gear 120 and selection mechanism 130 may be operatively attached to second structure 70 of FIGS. 3-11, thereby permitting selective operative coupling of first structure 60 to second structure 70.

Selection mechanism 130 may include a first selecting element 131, which also may be referred to herein as a first 140 pawl 118. First selecting element 131 may be engaged with gear 120, as illustrated in dash-dot lines, or disengaged from gear 120, as illustrated in dash-dot-dot lines. When first selecting element 131 is engaged with gear 120, first selecting element 131 may restrict rotation of gear 120 in a counterclockwise direction, while permitting rotation of gear 120 in a clockwise direction. When first selecting element 131 is disengaged from gear 120, first selecting element 131 does not limit rotation of gear 120.

Selection mechanism 130 also may include a second selecting element 132, which also may be referred to herein as a second 142 pawl 118. Second selecting element 132 may be engaged with gear 120, as illustrated in dash-dot lines, or disengaged from gear 120, as illustrated in dash-dot-dot lines. When second selecting element 132 is engaged with gear 120, second selecting element 132 may restrict rotation of gear 120 in the clockwise direction, while permitting rotation of gear 120 in the counterclockwise direction. When second selecting element 132 is disengaged from gear 120, second selecting element 132 does not limit rotation of gear 120.

Selection mechanism 130 further may include a third selecting element 133, which also may be referred to herein as a stop 133. Third selecting element 133 may be engaged with gear 120, as illustrated in dash-dot lines, or disengaged from gear 120, as illustrated in dash-dot-dot lines. When third selecting element 133 is engaged with gear 120, third selecting element 133 may restrict rotation of gear 120 in both the clockwise direction and the counterclockwise direction. When third selecting element 133 is disengaged from gear 120, third selecting element 133 does not limit rotation of gear 120.

As illustrated, third selecting element 133 may be separate and/or distinct from first selecting element 131 and/or from second selecting element 132. Additionally or alternatively, third selecting element 133 also may include first selecting element 131 and second selecting element 132. Under these conditions, and when both first selecting element 131 and second selecting element 132 are engaged with gear 120, rotation of gear 120 is restricted in both the clockwise direction and the counterclockwise direction.

Figure 23:
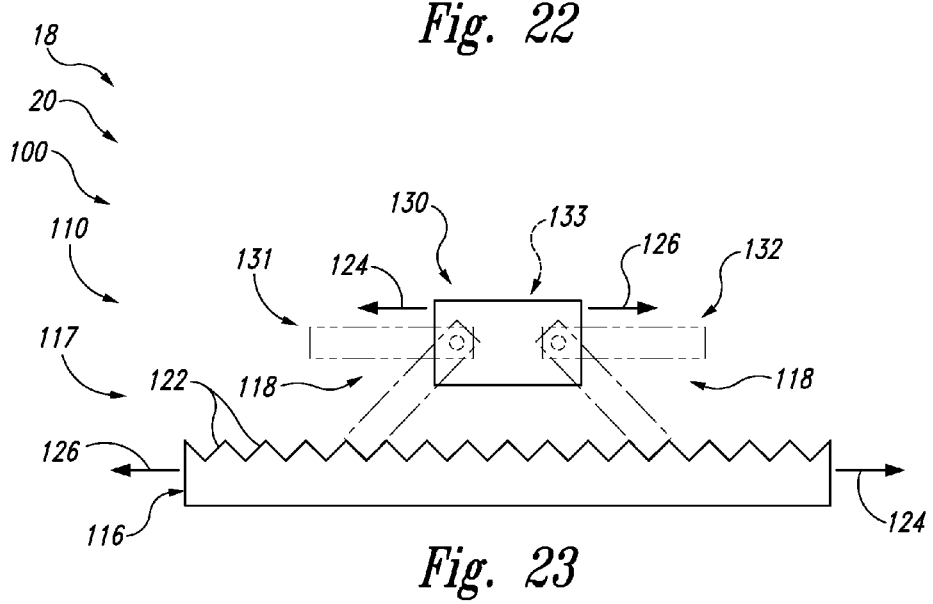
FIG. 23 is a schematic representation of a linear ratcheting assembly that may be utilized with and/or included in the systems and methods according to the present disclosure.

FIG. 23 is a schematic representation of a linear 117 ratcheting assembly 110 (or a linear ratcheting assembly 117) that may be utilized with and/or included in the systems and methods according to the present disclosure. Linear ratcheting assembly 117 may include a rack 116, which includes a plurality of teeth 122, and a selection mechanism 130. One of rack 116 and selection mechanism 130 may be operatively attached to first structure 60 of FIGS. 3-11, while the other of rack 116 and selection mechanism 130 may be operatively attached to second structure 70 of FIGS. 3-11, thereby permitting selective operative coupling of first structure 60 to second structure 70.

The operation of linear ratcheting assembly 117 of FIG. 23 may be at least substantially similar to the operation of rotary ratcheting assembly 119 of FIG. 22. However, linear ratcheting assembly 117 may be configured to selectively permit or restrict linear motion of first structure 60 relative to second structure 70. As an illustrative, non-exclusive example, engagement of a first selecting element 131 with rack 116 concurrent with disengagement of a second selecting element 132 from rack 116 may restrict relative motion in a first direction 124 while permitting relative motion in a second direction 126. Conversely, engagement of second selecting element 132 with rack 116 concurrent with disengagement of first selecting element 131 from rack 116 may permit relative motion in first direction 124 while restricting relative motion in second direction 126. In addition, disengagement of both first selecting element 131 and second selecting element 132 from rack 116 may permit relative motion in both first direction 124 and in second direction 126. Furthermore, concurrent engagement of both first selecting element 131 and second selecting element 132 (or engagement of a separate third selecting element 133, such as a stop 133) may restrict relative motion in both first direction 124 and in second direction 126.

As discussed herein with reference to FIG. 3, selection mechanism 130 of FIGS. 22-23 may be utilized to place ratcheting assembly 110 in one or more states and/or to transition ratcheting assembly 110 between, or among, a plurality of states. As an illustrative, non-exclusive example, and with reference to FIGS. 22-23, disengaging second selecting element 132 and third selecting element 133 and engaging first selecting element 131 with teeth 122 may define first state 111 that is discussed herein with reference to FIG. 3. Similarly, disengaging first selecting element 131 and third selecting element 133 and engaging second selecting element 132 with teeth 122 may define second state 112 that is discussed herein with reference to FIG. 3. In addition, engaging third selecting element 133 (or both first selecting element 131 and second selecting element 132) with teeth 122 may define third state 113 that is discussed herein with reference to FIG. 3. Furthermore, disengaging first selecting element 131, second selecting element 132, and third selecting element 133 from teeth 122 may define fourth state 114 that is discussed herein with reference to FIG. 3.

Figure 24:
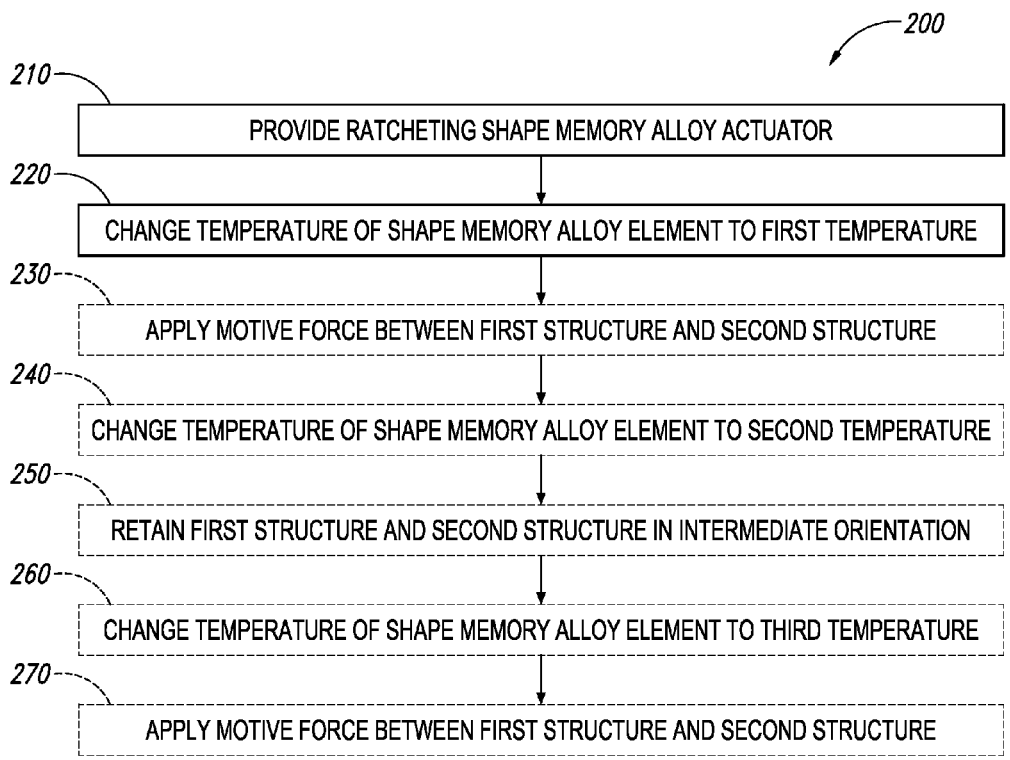
FIG. 24 is a flowchart depicting methods according to the present disclosure of regulating an orientation of a first structure relative to a second structure.

FIG. 24 is a flowchart depicting methods 200 according to the present disclosure of regulating an orientation of a first structure relative to a second structure. Methods 200 include providing a ratcheting shape memory alloy actuator at 210 and changing a temperature of a shape memory alloy element to a first temperature at 220. Methods 200 further may include applying a motive force between a first structure and a second structure at 230, changing the temperature of the shape memory alloy element to a second temperature at 240, retaining the first structure and the second structure in an intermediate relative orientation at 250, changing the temperature of the shape memory alloy element to a third temperature at 260, and/or applying the motive force between the first structure and the second structure at 270.

Providing the ratcheting shape memory alloy actuator at 210 may include providing any suitable ratcheting shape memory alloy actuator that includes the shape memory alloy element and a ratcheting assembly. As an illustrative, non-exclusive example, the providing at 210 may include providing ratcheting shape memory alloy actuator 100 that is discussed in more detail herein with reference to FIGS. 1-23.

Changing the temperature of the shape memory alloy element to the first temperature at 220 may include changing the temperature to deform the shape memory alloy element from a first conformation to a second conformation such that the shape memory alloy element applies a motive force to the ratcheting assembly. This may be performed in any suitable manner. As an illustrative, non-exclusive example, the changing at 220 may include heating the shape memory alloy element to change the conformation of the shape memory alloy element and/or to move the first structure and the second structure relative to one another in a first direction. As another illustrative, non-exclusive example, the changing at 220 also may include cooling the shape memory alloy element to change the conformation of the shape memory alloy element and/or to move the first structure and the second structure relative to one another in a second direction that is opposed to the first direction.

Applying the motive force between the first structure and the second structure at 230 may include applying the motive force via the ratcheting assembly. This may include translating, rotating, and/or otherwise moving the first structure and the second structure relative to one another.

Changing the temperature of the shape memory alloy element to the second temperature at 240 may include changing the temperature of the shape memory alloy element to any suitable second temperature such that the shape memory alloy element deforms from the second conformation to the first conformation. The changing at 240 may be accomplished in any suitable manner and may be at least substantially similar to the changing at 220, which is discussed herein.

Retaining the first structure and the second structure in the intermediate relative orientation at 250 may include retaining during the changing at 240. As an illustrative, non-exclusive example, the retaining at 250 may include retaining with the ratcheting assembly. As another illustrative, non-exclusive example, and as discussed herein, the ratcheting assembly may be configured to applying the motive force between the first structure and the second structure during the changing at 220 but to dissipate the motive force (i.e., not to apply the motive force between the first structure and the second structure) during the changing at 240.

Changing the temperature of the shape memory alloy element to the third temperature at 260 may include changing the temperature of the shape memory alloy element to any suitable third temperature such that the shape memory alloy element deforms from the first conformation to the second conformation. The changing at 260 may be accomplished in any suitable manner and may be at least substantially similar to the changing at 220, which is discussed herein.

Applying the motive force between the first structure and the second structure at 270 may include applying the motive force via the ratcheting assembly. This may include translating, rotating, and/or otherwise moving the first structure and the second structure relative to one another.

Figure 25:
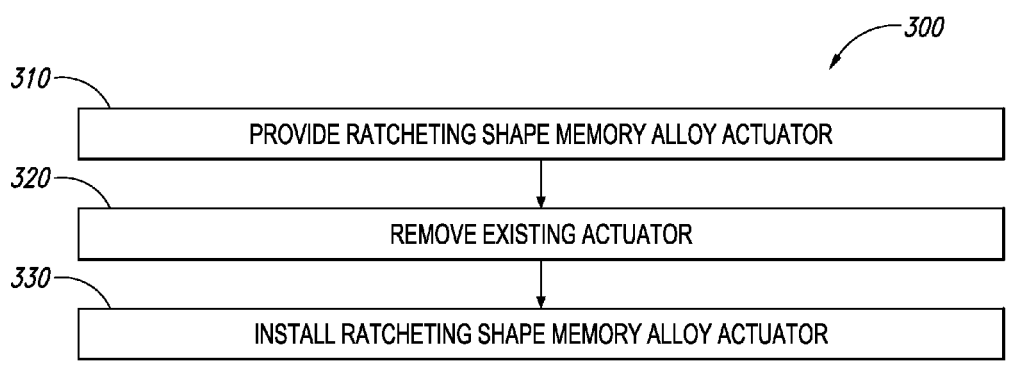
FIG. 25 is a flowchart depicting methods according to the present disclosure of retrofitting an aircraft with a ratcheting shape memory alloy actuator according to the present disclosure.

FIG. 25 is a flowchart depicting methods 300 according to the present disclosure of retrofitting an aircraft with a ratcheting shape memory alloy actuator according to the present disclosure. Methods 300 include providing the ratcheting shape memory alloy actuator at 310, removing an existing actuator at 320, and installing the ratcheting shape memory alloy actuator at 330.

Providing the ratcheting shape memory alloy actuator at 310 may include providing any suitable ratcheting shape memory alloy actuator. As an illustrative, non-exclusive example, the providing at 310 may include providing ratcheting shape memory alloy actuator 100, which is discussed in more detail herein with reference to FIGS. 1-23.

Removing the existing actuator at 320 may include removing the existing actuator in any suitable manner. As illustrative, non-exclusive examples, the removing at 320 may include unbolting, unfastening, and/or unattaching the existing actuator from the aircraft.

Installing the ratcheting shape memory alloy actuator at 330 may include installing the ratcheting shape memory alloy actuator within the aircraft in place of the existing actuator and may be accomplished in any suitable manner. As illustrative, non-exclusive examples, the installing at 330 may include bolting, fastening, and/or operatively attaching the ratcheting shape memory alloy actuator to the aircraft.

Illustrative, non-exclusive examples of inventive subject matter according to the present disclosure are described in the following enumerated paragraphs:

A1. A ratcheting shape memory alloy actuator that is configured to adjust an orientation of a first structure relative to a second structure, the actuator comprising:

a first bracket that is configured to be operatively coupled to the first structure;

a ratcheting assembly that is operatively coupled to the first bracket;

a second bracket that is configured to be operatively coupled to the second structure; and a shape memory alloy element that is located between and operatively coupled to the second bracket and to the ratcheting assembly, wherein the shape memory alloy element is configured to apply a motive force to the ratcheting assembly upon deformation between a first conformation and a second conformation to selectively adjust the orientation of the first structure relative to the second structure.

A2. The actuator of paragraph A1, wherein the actuator further includes a selection mechanism that is configured to selectively control the operation of the ratcheting assembly.

A3. The actuator of paragraph A2, wherein the ratcheting assembly includes a plurality of states, and further wherein the selection mechanism is configured to selectively transition the ratcheting assembly among the plurality of states.

A4. The actuator of paragraph A3, wherein the plurality of states includes at least two, optionally at least three, and further optionally all, of:

(i) a first state, wherein the ratcheting assembly is configured to utilize the motive force to change the orientation of the first structure relative to the second structure when the shape memory alloy element undergoes a first deformation from the first conformation to the second conformation and to dissipate the motive force when the shape memory alloy element undergoes a second deformation from the second conformation to the first conformation, optionally without changing the orientation of the first structure relative to the second structure;

(ii) a second state, wherein the ratcheting assembly is configured to utilize the motive force to change the orientation of the first structure relative to the second structure when the shape memory alloy element undergoes the second deformation and to dissipate the motive force when the shape memory alloy element undergoes the first deformation, optionally without changing the orientation of the first structure relative to the second structure;

(iii) a third state, wherein the ratcheting assembly is configured to restrict motion of the first structure relative to the second structure; and (iv) a fourth state, wherein the ratcheting assembly is configured to dissipate the motive force when the shape memory alloy element undergoes the first deformation and the second deformation, optionally without changing the orientation of the first structure relative to the second structure.

A5. The actuator of any of paragraphs A3-A4, wherein the plurality of states includes at least two, optionally at least three, optionally at least four, and further optionally all, of:

(i) a/the first state, wherein the ratcheting assembly operatively couples the first structure to the second structure via the shape memory alloy element when the shape memory alloy element undergoes a/the first deformation from the first conformation to the second conformation and operatively decouples the shape memory alloy element from at least one of the first structure and the second structure when the shape memory alloy element undergoes a/the second deformation from the second conformation to the first conformation;

(ii) a/the second state, wherein the ratcheting assembly operatively couples the first structure to the second structure via the shape memory alloy element when the shape memory alloy element undergoes the second deformation and operatively decouples the shape memory alloy element from at least one of the first structure and the second structure when the shape memory alloy element undergoes the first deformation;

(iii) a/the third state, wherein the ratcheting assembly restricts motion of the first structure relative to the second structure; and (iv) a/the fourth state, wherein the ratcheting assembly operatively decouples the shape memory alloy element from at least one of the first structure and the second structure when the shape memory alloy element undergoes the first deformation and the second deformation.

A6. The actuator of any of paragraphs A4-A5, wherein the selection mechanism includes a first selecting element that is configured to retain the ratcheting assembly in the first state, optionally wherein the first selecting element is a first pawl.

A7. The actuator of any of paragraphs A4-A6, wherein the selection mechanism includes a second selecting element that is configured to retain the ratcheting assembly in the second state, optionally wherein the second selecting element is different from the first selecting element, optionally wherein the second selecting element is the first selecting element, and further optionally wherein the second selecting element is a second pawl.

A8. The actuator of any of paragraphs A4-A7, wherein the selection mechanism includes a third selecting element that is configured to retain the ratcheting assembly in the third state, optionally wherein the third selecting element is different from at least one, optionally both, of the first selecting element, and the second selecting element, optionally wherein the third selecting element is at least one, optionally both, of the first selecting element, and the second selecting element, optionally wherein the third selecting element is a stop, and further optionally wherein the third selecting element is a third pawl.

A9. The actuator of any of paragraphs A2-A8, wherein the selection mechanism includes at least one of a mechanically actuated selection mechanism, a hydraulically actuated selection mechanism, a pneumatically actuated selection mechanism, and an electrically actuated selection mechanism.

A10. The actuator of any of paragraphs A2-A9, wherein the selection mechanism includes at least one of a manually actuated selection mechanism and an automatically actuated selection mechanism.

A11. The actuator of any of paragraphs A1-A10, wherein the shape memory alloy element is a shape memory alloy torque tube.

A12. The actuator of paragraph A11, wherein the shape memory alloy torque tube includes a cylindrical body that has a first end and a second end that is spaced apart from the first end along a longitudinal axis of the cylindrical body.

A13. The actuator of paragraph A12, wherein the first end rotates relative to the second end when the shape memory alloy torque tube deforms between the first conformation and the second conformation.

A14. The actuator of any of paragraphs A1-A13, wherein the first conformation is different from the second conformation.

A15. The actuator of any of paragraphs A1-A14, wherein the shape memory alloy element comprises nickel and titanium and exists in a martensite phase at (relatively) lower temperatures and in an austenite phase at (relatively) higher temperatures.

A16. The actuator of any of paragraphs A1-A15, wherein the shape memory alloy element comprises a metal alloy that includes at least two of hafnium, palladium, platinum, copper, aluminum, nickel, titanium, zinc, gold, and iron.

A17. The actuator of any of paragraphs A1-A15, wherein the ratcheting assembly is a rotary ratcheting assembly.

A18. The actuator of paragraph A17, wherein the rotary ratcheting assembly includes a gear and a pawl.

A19. The actuator of paragraph A18, wherein one of the gear and the pawl is operatively attached to the first structure, and further wherein the other of the gear and the pawl is operatively attached to the second structure.

A20. The actuator of any of paragraphs A1-A19, wherein the ratcheting assembly is a linear ratcheting assembly.

A21. The actuator of paragraph A20, wherein the linear ratcheting assembly includes a rack and a pawl.

A22. The actuator of paragraph A21, wherein one of the rack and the pawl is operatively attached to the first structure, and further wherein the other of the rack and the pawl is operatively attached to the second structure.

A23. The actuator of any of paragraphs A1-A22, wherein the ratcheting assembly is configured to translate at least a portion of the first structure relative to at least a portion of the second structure.

A24. The actuator of any of paragraphs A1-A23, wherein the ratcheting assembly is configured to rotate at least a portion of the first structure relative to at least a portion of the second structure.

A25. The actuator of any of paragraphs A1-A24, wherein the actuator further includes a temperature control structure that is configured to selectively transition the shape memory alloy element between the first conformation and the second conformation by regulating a temperature of the shape memory alloy element.

A26. The actuator of paragraph A25, wherein the temperature control structure includes a heating element, optionally wherein the heating element includes an electric heating element, and further optionally wherein the heating element includes a resistive heating element.

A27. The actuator of any of paragraphs A25-A26, wherein the temperature control structure includes a cooling element, optionally wherein the cooling element includes an electric cooling element, and further optionally wherein the cooling element includes a Peltier device.

A28. The actuator of any of paragraphs A1-A27, wherein one of the first structure and the second structure includes at least one of an aircraft, a wing of an aircraft, a horizontal stabilizer of an aircraft, a vertical stabilizer of an aircraft, a tail of an aircraft, and a fuselage of an aircraft.

A29. The actuator of paragraph A28, wherein the other of the first structure and the second structure includes at least one of an actuated component, a door, a main landing gear door, a nose landing gear door, a flap, a trailing edge flap, a spoiler, a rudder, an elevator, a leading edge slat, and an aileron.

A30. The actuator of any of paragraphs A1-A29, wherein the shape memory alloy element is a first shape memory alloy element, and further wherein the actuator includes a second shape memory alloy element that is operatively coupled to the ratcheting assembly.

A31. The actuator of paragraph A30, wherein the ratcheting assembly is located between and operatively attached to the first shape memory alloy element and the second shape memory alloy element.

A32. The actuator of any of paragraphs A30-A31, wherein the motive force is a first motive force, and further wherein the second shape memory alloy element is configured to apply a second motive force to the ratcheting assembly.

A33. The actuator of paragraph A32, wherein the second motive force supplements the first motive force.

A34. The actuator of paragraph A32, wherein the second motive force is opposed to the first motive force.

A35. The actuator of any of paragraphs A1-A34, wherein the actuator further includes a biasing mechanism, wherein the shape memory alloy element is configured to transition the first structure and the second structure relative to one another in a first direction, and further wherein the biasing mechanism is configured to transition the first structure and the second structure relative to one another in a second direction that is opposed to the first direction.

A36. The actuator of any of paragraphs A1-A35, wherein the ratcheting assembly is a first ratcheting assembly, wherein the actuator further includes a second ratcheting assembly, and further wherein the second ratcheting assembly is located between and operatively coupled to the shape memory alloy element and the second bracket.

A37. The actuator of paragraph A36, wherein the shape memory alloy element is a shape memory alloy torque tube that is configured to rotate upon transitioning between the first conformation and the second conformation, and further wherein the first ratcheting assembly includes a rotating extension that is operatively coupled to the shape memory alloy torque tube and is configured to rotate with the shape memory alloy torque tube.

A38. The actuator of paragraph A37, wherein the first bracket is operatively coupled to the rotating extension.

A39. The actuator of any of paragraphs A37-A38, wherein the first ratcheting assembly further includes a first ratchet housing that is configured to support the rotating extension, and further wherein the first ratcheting assembly is configured to selectively permit rotation of the rotating extension relative to the first ratchet housing.

A40. The actuator of paragraph A39, wherein the actuator further includes a third bracket, wherein the third bracket is configured to operatively couple the first ratchet housing to the second structure, and optionally wherein the third bracket is located between the rotating extension and the second structure when the third bracket is operatively coupled to the second structure.

B1. A system, comprising:
the ratcheting shape memory alloy actuator of any of paragraphs A1-A40;
the first structure; and
the second structure.

B2. The system of paragraph B1, wherein the actuator is a first actuator, and further wherein the system includes a second actuator that also is configured to adjust the orientation of the first structure relative to the second structure.

B3. The system of paragraph B2, wherein the second actuator is configured to operate in opposition to the first actuator.

B4. The system of any of paragraphs B2-B3, wherein the first actuator is configured to translate the first structure relative to the second structure in a/the first direction, and further wherein the second actuator is configured to translate the first structure relative to the second structure in a/the second direction that is opposed to the first direction.

B5. The system of paragraph B2, wherein the second actuator is configured to supplement the first actuator.

C1. A method of regulating an orientation of a first structure relative to a second structure, the method comprising:
providing a ratcheting shape memory alloy actuator that includes a shape memory alloy element and a ratcheting assembly; and
changing a temperature of the shape memory alloy element to a first temperature with a temperature control structure to deform the shape memory alloy element from a first conformation to a second conformation and apply a motive force to the ratcheting assembly.

C2. The method of paragraph C1, wherein the ratcheting shape memory alloy actuator includes the ratcheting shape memory alloy actuator of any of paragraphs A1-A40.

C3. The method of any of paragraphs C1-C2, wherein the changing includes heating the shape memory alloy element to translate the first structure relative to the second structure in a first direction.

C4. The method of any of paragraphs C1-C3, wherein the changing includes cooling the shape memory alloy element to translate the first structure relative to the second structure in a second direction.

C5. The method of paragraph C4, wherein the second direction is opposed to the first direction.

C6. The method of any of paragraphs C1-05, wherein the method further includes applying the motive force between the first structure and the second structure via the ratcheting assembly to translate the first structure relative to the second structure.

C7. The method of any of paragraphs C1-C6, wherein, subsequent to the changing the temperature of the shape memory alloy element to the first temperature, the method further includes changing the temperature of the shape memory alloy element to a second temperature with the temperature control structure to deform the shape memory alloy element from the second conformation to the first conformation while retaining the first structure and the second structure in an intermediate relative orientation with the ratcheting assembly.

C8. The method of paragraph C7, wherein, subsequent to the changing the temperature of the shape memory alloy element to the second temperature, the method further includes changing the temperature of the shape memory alloy element to a third temperature with the temperature control structure to deform the shape memory alloy element from the first conformation to the second conformation and applying the motive force between the first structure and the second structure via the ratcheting assembly to translate the first structure relative to the second structure.

D1. A method of retrofitting an aircraft with an actuator that includes a ratcheting assembly and a shape memory alloy element, the method comprising:
providing the ratcheting shape memory alloy actuator of any of paragraphs A1-A40;
removing an existing actuator from the aircraft; and
installing the ratcheting shape memory alloy actuator within the aircraft in place of the existing actuator.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A ratcheting shape memory alloy actuator that is configured to adjust an orientation of a first structure relative to a second structure, the actuator comprising:
a first bracket that is configured to be operatively coupled to the first structure;
a ratcheting assembly that is operatively coupled to the first bracket;
a second bracket that is configured to be operatively coupled to the second structure; and
a shape memory alloy torque tube that is located between and operatively coupled to the second bracket and to the ratcheting assembly, wherein:
(i) the shape memory alloy torque tube applies a first motive force to the ratcheting assembly upon deformation from a first conformation to a second conformation;
(ii) responsive to receipt of the first motive force, the ratcheting assembly selectively adjusts the orientation of the first structure relative to the second structure;
(iii) the shape memory alloy torque tube applies an opposed second motive force to the ratcheting assembly upon deformation from the second conformation to the first conformation; and
(iv) the ratcheting assembly dissipates the second motive force without relative motion between the first structure and the second structure.

2. The actuator of claim 1, wherein the actuator further includes a selection mechanism that selectively controls operation of the ratcheting assembly.

3. The actuator of claim 2, wherein the ratcheting assembly includes a plurality of states, and further wherein the selection mechanism selectively transitions the ratcheting assembly among the plurality of states.

4. The actuator of claim 3, wherein the plurality of states includes:
(i) a first state in which the ratcheting assembly utilizes the first motive force to change the orientation of the first structure relative to the second structure when the shape memory alloy torque tube undergoes a first deformation from the first conformation to the second conformation and dissipates the second motive force, without changing the orientation of the first structure relative to the second structure, when the shape memory alloy torque tube undergoes a second deformation from the second conformation to the first conformation;
(ii) a second state in which the ratcheting assembly utilizes the second motive force to change the orientation of the first structure relative to the second structure when the shape memory alloy torque tube undergoes the second deformation and dissipates the first motive force, without changing the orientation of the first structure relative to the second structure, when the shape memory alloy torque tube undergoes the first deformation; and
(iii) a third state in which the ratcheting assembly restricts motion of the first structure relative to the second structure.

5. The actuator of claim 3, wherein the plurality of states includes:
(i) a first state in which the ratcheting assembly operatively couples the first structure to the second structure, via the shape memory alloy torque tube, when the shape memory alloy torque tube undergoes a first deformation from the first conformation to the second conformation and operatively decouples the shape memory alloy torque tube from at least one of the first structure and the second structure when the shape memory alloy torque tube undergoes a second deformation from the second conformation to the first conformation;

(ii) a second state in which the ratcheting assembly operatively couples the first structure to the second structure, via the shape memory alloy torque tube, when the shape memory alloy torque tube undergoes the second deformation and operatively decouples the shape memory alloy torque tube from at least one of the first structure and the second structure when the shape memory alloy torque tube undergoes the first deformation; and (iii) a third state in which the ratcheting assembly restricts motion of the first structure relative to the second structure.

6. The actuator of claim 1, wherein the shape memory alloy torque tube includes a cylindrical body that has a first end and a second end that is spaced apart from the first end along a longitudinal axis of the cylindrical body.

7. The actuator of claim 6, wherein the first end rotates relative to the second end when the shape memory alloy torque tube deforms between the first conformation and the second conformation.

8. The actuator of claim 1, wherein the shape memory alloy torque tube comprises nickel and titanium and exists in a martensite phase at lower temperatures and in an austenite phase at higher temperatures.

9. The actuator of claim 1, wherein the ratcheting assembly is a rotary ratcheting assembly that includes a gear and a pawl.

10. The actuator of claim 1, wherein the ratcheting assembly is a linear ratcheting assembly that includes a rack and a pawl.

11. The actuator of claim 1, wherein the actuator further includes a temperature control structure that selectively transitions the shape memory alloy torque tube between the first conformation and the second conformation by regulating a temperature of the shape memory alloy torque tube.

12. The actuator of claim 1, wherein one of the first structure and the second structure includes at least one of an aircraft, a wing of an aircraft, a horizontal stabilizer of an aircraft, a vertical stabilizer of an aircraft, a tail of an aircraft, and a fuselage of an aircraft, and further wherein the other of the first structure and the second structure includes at least one of an actuated component, a door, a main landing gear door, a nose landing gear door, a flap, a trailing edge flap, a spoiler, a rudder, an elevator, a leading edge slat, and an aileron.

13. The actuator of claim 1, wherein the shape memory alloy torque tube is a first shape memory alloy torque tube, and further wherein the actuator includes a second shape memory alloy torque tube that is operatively coupled to the ratcheting assembly.

14. The actuator of claim 13, wherein the ratcheting assembly is located between and operatively attached to the first shape memory alloy torque tube and the second shape memory alloy torque tube, wherein the first shape memory alloy torque tube applies a first torque tube motive force to the ratcheting assembly, and further wherein the second shape memory alloy torque tube applies a second torque tube motive force to the ratcheting assembly.

15. The actuator of claim 14, wherein the second torque tube motive force supplements the first torque tube motive force.

16. The actuator of claim 14, wherein the second torque tube motive force is opposed to the first torque tube motive force.

17. The actuator of claim 1, wherein the ratcheting assembly is a first ratcheting assembly, wherein the actuator further includes a second ratcheting assembly, and further wherein the second ratcheting assembly is located between and operatively coupled to the shape memory alloy torque tube and the second bracket.

18. The actuator of claim 17, wherein the shape memory alloy torque tube rotates upon transitioning between the first conformation and the second conformation, and further wherein the first ratcheting assembly includes a rotating extension that is operatively coupled to the shape memory alloy torque tube and rotates with the shape memory alloy torque tube.

19. The actuator of claim 18, wherein the first bracket is operatively coupled to the rotating extension, wherein the first ratcheting assembly further includes a first ratchet housing that supports the rotating extension, wherein the first ratcheting assembly selectively permits rotation of the rotating extension relative to the first ratchet housing, and further wherein the actuator further includes a third bracket that operatively couples the first ratchet housing to the second structure.

20. A system, comprising:
the ratcheting shape memory alloy actuator of claim 1;
the first structure; and
the second structure.

21. A method of regulating an orientation of a first structure relative to a second structure, the method comprising:
providing a ratcheting shape memory alloy actuator that includes a shape memory alloy element and a ratcheting assembly;
changing a temperature of the shape memory alloy element to a first temperature with a temperature control structure to deform the shape memory alloy element from a first conformation to a second conformation and apply a motive force to the ratcheting assembly; and
applying the motive force between the first structure and the second structure via the ratcheting assembly to translate the first structure relative to the second structure.

22. The method of claim 21, wherein, subsequent to the changing the temperature of the shape memory alloy element to the first temperature, the method further comprises:
changing the temperature of the shape memory alloy element to a second temperature with the temperature control structure to deform the shape memory alloy element from the second conformation to the first conformation while retaining the first structure and the second structure in an intermediate relative orientation with the ratcheting assembly; and
subsequent to the changing the temperature of the shape memory alloy element to the second temperature, changing the temperature of the shape memory alloy element to a third temperature with the temperature control structure to deform the shape memory alloy element from the first conformation to the second conformation and applying the motive force between the first structure and the second structure via the ratcheting assembly to translate the first structure relative to the second structure.

* * * * *